United States Patent
Westhoff et al.

(10) Patent No.: US 7,501,480 B2
(45) Date of Patent: Mar. 10, 2009

(54) AUTOCATALYZED, THERMOSETTING MATERIALS THAT ARE FREE FROM EXTERNAL CATALYSTS AND ARE BASED ON CONDENSATES OF EPOXY-FUNCTIONAL SILANES, AND USE THEREOF FOR PRODUCTION OF THERMOSETTING MATERIALS

(75) Inventors: Elke Westhoff, Steinfurt (DE); Manuela Niemeier, Dremsteinfurt (DE); Winfried Stübbe, Greven (DE); Andreas Poppe, Münster (DE)

(73) Assignee: BASF Coatings AG, Munster (DE)

( * ) Notice: Subject to any disclaimer, the term of this patent is extended or adjusted under 35 U.S.C. 154(b) by 367 days.

(21) Appl. No.: 10/555,469

(22) PCT Filed: Apr. 23, 2004

(86) PCT No.: PCT/EP2004/004318

§ 371 (c)(1),
(2), (4) Date: Nov. 2, 2005

(87) PCT Pub. No.: WO2004/099322

PCT Pub. Date: Nov. 18, 2004

(65) Prior Publication Data

US 2007/0166550 A1    Jul. 19, 2007

(30) Foreign Application Priority Data

May 8, 2003    (DE) ................ 103 20 432

(51) Int. Cl.
C08G 77/04    (2006.01)
C07F 9/02    (2006.01)
C07F 7/04    (2006.01)

(52) U.S. Cl. .............. 528/27; 556/405; 556/413; 556/421

(58) Field of Classification Search ............ 528/27; 556/405, 413, 421
See application file for complete search history.

(56) References Cited

U.S. PATENT DOCUMENTS

| | | | | |
|---|---|---|---|---|
| 3,209,053 A | * | 9/1965 | Gilkey et al. ............ | 427/387 |
| 3,856,756 A | * | 12/1974 | Wagner et al. ............ | 528/49 |
| 3,927,042 A | | 12/1975 | Gölitz et al. ......... | 260/348 SC |
| 4,818,790 A | * | 4/1989 | Ooka et al. ............. | 525/103 |
| 5,354,829 A | * | 10/1994 | Swisher et al. ........... | 528/10 |
| 5,576,406 A | * | 11/1996 | Yamamura et al. ......... | 526/320 |
| 5,962,588 A | * | 10/1999 | Iwamura et al. .......... | 525/103 |
| 5,985,980 A | * | 11/1999 | Harui et al. ............. | 524/506 |
| 6,072,000 A | * | 6/2000 | Harui et al. ............. | 524/802 |
| 6,103,788 A | * | 8/2000 | Harui et al. ............. | 523/403 |
| 6,333,368 B1 | * | 12/2001 | Harui et al. ............. | 523/411 |
| 6,482,890 B2 | * | 11/2002 | Kiyohara et al. .......... | 524/806 |
| 6,946,174 B1 | * | 9/2005 | Chen .................... | 428/35.7 |
| 2002/0018900 A1 | * | 2/2002 | Kron et al. .............. | 428/447 |
| 2002/0045683 A1 | * | 4/2002 | Kiyohara et al. .......... | 523/440 |
| 2003/0114583 A1 | * | 6/2003 | Stark et al. .............. | 524/588 |
| 2003/0152708 A1 | * | 8/2003 | Kron et al. ............. | 427/385.5 |
| 2006/0287545 A1 | * | 12/2006 | Poppe et al. ............. | 556/411 |

FOREIGN PATENT DOCUMENTS

DE    2037617    10/1972
EP    1036827    6/2000

OTHER PUBLICATIONS

Official English language translation of DE-19910876.*
Official English language translation of DE-19910876, Jun. 3, 2000.*
English language abstract for EP 1 036 827 A2.
English language abstract for EP 1 036 827 A2, Jun. 3, 2000.

* cited by examiner

Primary Examiner—Randy Gulakowski
Assistant Examiner—Robert Loewe
(74) Attorney, Agent, or Firm—Cantor Colburn LLP

(57) ABSTRACT

Autocatalyzed, thermally curable compositions free from external catalysts and comprising condensates of silanes which contain at least one of hydrolyzable atoms and hydrolyzable groups and processes for preparing them, and their use for producing thermally cured compositions.

18 Claims, No Drawings

AUTOCATALYZED, THERMOSETTING MATERIALS THAT ARE FREE FROM EXTERNAL CATALYSTS AND ARE BASED ON CONDENSATES OF EPOXY-FUNCTIONAL SILANES, AND USE THEREOF FOR PRODUCTION OF THERMOSETTING MATERIALS

CROSS REFERENCE TO RELATED APPLICATION

This application is based on PCT/EP2004/004318 filed on 23 Apr. 2004, which claims priority to DE 10320432.6, filed 8 May 2003.

FIELD OF THE INVENTION

The present invention relates to new, autocatalyzed, thermally curable compositions free from external catalysts and based on condensates of epoxy-functional silanes. The present invention also relates to the use of the new, autocatalyzed, thermally curable compositions free from external catalysts and based on condensates of epoxy-functional silanes for producing thermally cured compositions, especially coatings and coating systems, and also moldings, especially optical moldings, and self-supporting films.

BACKGROUND OF THE INVENTION

Thermally curable compositions based on condensates of epoxy-functional silanes which contain no urethane groups are known from patent applications EP 1 179 575 A2, WO 00/35599 A, WO 99/52964 A, WO 99/54412 A, DE 197 26 829 A1 or DE 195 40 623 A1. They serve in particular for producing highly scratch-resistant coatings. A key feature is that these known thermally curable compositions must have external catalysts or initiators for the reaction of the epoxide groups added to them (cf., e.g., WO 99/52964 A, page 8, line 29, to page 9, line 20) in order that the compositions cure at a practical rate at comparatively low temperatures of 100 to 160° C.

The use of external catalysts, however, is attended by numerous disadvantages. For instance, it severely curtails the processing time or potlife of the known thermally curable compositions.

Where they are to be used to produce coatings with a thickness of more than 20 μm, as typically employed for the clearcoats of automotive OEM coating systems, they must be modified in order that the resulting coatings do not have stress cracks. This is done, as is known, by incorporating flexibilizing structural elements, which accommodate the stresses, into the three-dimensional, organic-inorganic hybrid networks. In order to bring this about, the known, thermally curable compositions, typically present in aqueous alcoholic media, are admixed with binders which are stable in these media. These binders are preferably in the form of aqueous dispersions. These dispersions, however, frequently exhibit a high level of interaction with the catalysts used, and so they cannot be employed together. The result is the removal of many conceivable possibilities for modifying the known thermally curable compositions in an advantageous way.

German patent application DE 199 10 876 A1 discloses thermally curable compositions based on condensates of silanes of the general formula i $$X_m SiR_{1-m} Y_n \quad (i).$$

In the general formula i the variables X stand for hydrogen, halogen, alkoxy, acyloxy, alkylcarbonyl, alkoxycarbonyl, or —NR'$_2$ (R'=hydrogen and/or alkyl).

The variables R can be identical or different and stand for alkyl, alkenyl, alkynyl, aryl, arylalkyl, alkylaryl, arylalkenyl, alkenylaryl, arylalkynyl or alkynylaryl, it being possible for these radicals to be interrupted by oxygen or sulfur atoms or by the groups —NR'— or —N(H)C(O)O— (urethane) and to carry one or more substituents from the group consisting of halogens and unsubstituted or substituted amino, amide, aldehyde, keto, alkylcarbonyl, carboxyl, mercapto, cyano, hydroxyl, alkoxy, alkoxycarbonyl, sulfonic acid, phosphoric acid, methylacryloyloxy, epoxide, and vinyl groups.

The variable Y stands for blocked isocyanate groups.

The indices m and n stand for whole numbers from 1 to 3.

These obligatory silanes can be cocondensed with the optional silanes of the general formula ii $$X_m SiR_{1-m} Z_n \quad (ii).$$

In this general formula ii the index n stands for a whole number from 1 to 4. The variables X and R are as defined above. The variables Z stand for hydroxyl, amino, NH(CH$_2$)$_2$NH$_2$ or epoxide groups.

There are, accordingly, a massive number of compounds covered by the general formula i, which, moreover, can also be combined with a similarly large number of compounds of the general formula ii.

Although FIG. 6 of German patent application DE 199 10 876 A1 mentions the reaction product of 3-isocyanatopropyltriethoxysilane and glycidol as an example of a silane ii no details are given of the thermally curable compositions in question and nor is the compound emphasized in any form as being particularly advantageous or used, not even by way of example.

Furthermore, for the known thermally curable compositions it is essential that they are crosslinked primarily by way of the blocked isocyanate groups. For this, however, particularly high temperatures and long cure times must be employed (cf. DE 199 10 876 A1: Example 1, page 3, line 43: 180° C./45 minutes; Example 2, page 4, line 32: 180° C./30 minutes). Conditions of this kind, however, are completely unsuitable for processes in such economically important fields as that of automotive OEM finishing.

SUMMARY OF THE INVENTION

It is an object of the present invention to provide new thermally curable compositions based on condensates of epoxy-functional silanes that no longer have the disadvantages of the prior art but instead can be cured rapidly at comparatively low temperatures even without external catalysts or initiators. In addition these new thermally curable compositions ought to be able to be modified easily to provide thermally cured compositions, especially coatings and coating systems and also moldings, especially optical moldings, and self-supporting films which are chemically resistant, highly scratch-resistant, of high gloss, flexible, transparent, and clear, the thermally cured compositions, in particular the coatings and coating systems, in dry film thicknesses >30 μm no longer exhibiting stress cracks or delamination from the substrates and therefore being more broadly applicable than the existing thermally curable compositions based on condensates of epoxy-functional silanes. In particular the new thermally cured compositions produced from the new thermally curable compositions ought to have a high scratch resistance in conjunction with a high chemical resistance and should be suitable for producing clearcoats for automotive OEM finishing.

It was an object of the present invention further to provide a new process for producing thermally cured compositions from thermally curable compositions based on condensates of epoxy-functional silanes that is easier to carry out than the processes for producing the known thermally cured compositions and which in particular can be accomplished without the use of external catalysts and initiators.

The invention accordingly provides the new, autocatalyzed, thermally curable compositions free from external catalysts and comprising at least one condensate of at least one epoxy-functional silane selected from the group of silanes which contain at least one hydrolyzable atom and/or one hydrolyzable group and also (i) at least one nonhydrolyzable, isocyanate-adduct-group-free group with at least one epoxide group, and at least one nonhydrolyzable, epoxide-group-free group with at least one group selected from the group consisting of
   (a) divalent linking urethane groups —NH—C(X)—X— and —X—(X)C—NH—,
   (b) divalent linking urea groups —HN—C(X)—NH—, and
   (c) monovalent terminal groups Y—C(X)—NH—,
   in which the variable X stands for an oxygen or sulfur atom and the variable Y stands for the radical of a blocking agent for isocyanate groups; or (ii) at least one nonhydrolzable group with at least one epoxide group and at least one group selected from the group consisting of the groups (a), (b), and (c), or (iii) at least one nonhydrolyzable, isocyanate-adduct-group-free group with at least one epoxide group, at least one nonhydrolyzable, epoxide-group-free group with at least one group selected from the group consisting of the groups (a), (b), and (c), and at least one, preferably one, nonhydrolyzable group with at least one epoxide group and at least one group selected from the group consisting of the groups (a), (b), and (c).

The new, autocatalyzed, thermally curable compositions free from external catalysts and based on condensates of epoxy-functional silanes are referred to below as "compositions of the invention".

The invention further provides the new process for producing thermally cured compositions from thermally curable compositions based on condensates of epoxy-functional silanes, in which process at least one composition of the invention is thermally cured in the absence of external catalysts, and which is referred to below as"process of the invention".

In the light of the prior art it was surprising and unforeseeable for the skilled worker that the object on which the present invention was based could be achieved by means of the compositions of the invention and of the process of the invention.

In particular it was surprising that the compositions of the invention could be cured rapidly at comparatively low temperatures even without external catalysts or initiators. The compositions of the invention had a considerably longer pot life or processing time than the known thermally curable compositions, which considerably simplified their use in industrial practice.

Furthermore it was possible without problems to modify the compositions of the invention so that they gave thermally cured compositions, especially coatings and coating systems, and also moldings, especially optical moldings, and self-supporting films all of which were chemically resistant, highly scratch-resistant, of high gloss, flexible, transparent, and clear; the thermally cured compositions, especially the coatings and the coating systems, in dry film thicknesses >30 µm no longer exhibited any stress cracks or delamination from the substrates and were therefore more broadly applicable than the existing thermally curable compositions based on condensates of epoxy-functional silanes. In particular the compositions of the invention were outstandingly suitable for producing clear coats for automotive OEM finishing.

It was additionally surprising that the process of the invention was easier to carry out than the processes for producing the known thermally cured compositions and was accomplished in particular without the use of external catalysts and initiators.

DETAILED DESCRIPTION OF THE INVENTION

For the purposes of the present invention "autocatalyzed" means that the thermal curing of the compositions of the invention is catalyzed by starting products and/or intermediates which are formed in the course of the thermal cure (cf. Römpp Online, Georg Thieme Verlag, Stuttgart, 2002, "Autocatalysis").

For the purposes of the present invention external catalysts or initiators are substances which typically catalyze the thermal curing of thermally curable compositions by way of epoxide groups. In the judgement of the art such catalysts are a fundamental prerequisite to achieving proper results (cf. Johan Bieleman, "Lackadditive" [Additives for Coatings], Wiley-VCH, Weinheim, N.Y., 1998, "7.2.4 Epoxy resin systems", pages 263 to 269). Further examples of catalysts of this kind which can also be employed in thermally curable compositions based on condensates of epoxy-functional silanes are known from, for example, international patent application WO 99/52964 A, page 8, line 29 to page 9, line 20, or from German patent application DE 197 26 829 A1, column 3, line 65 to column 4, line 64.

In the context of the present invention "free from external catalysts" means that the compositions of the invention do not contain external catalysts at all or contain them only in amounts which do not color the profile of properties of the compositions of the invention but instead influence it insubstantially if at all.

In the context of the present invention "isocyanate-adduct-group-free groups" means that the group in question is free from adduct groups which result from reactions of isocyanate groups with isocyanate-reactive functional groups or compounds, such as urethane groups, urea groups or blocked isocyanate groups, for example.

The compositions of the invention comprise at least one condensate of at least one epoxy-functional silane. Condensates are formed, as is known, by the hydrolysis and condensation of silanes containing hydrolyzable groups by the process known as the sol-gel process (cf. Römpp Online, Georg Thieme Verlag, Stuttgart, 2002 "Sol-Gel process").

In accordance with the invention the silane obligatorily contains at least one hydrolyzable atom and/or at least one hydrolyzable group. Preferably it contains at least two, in particular at least three, hydrolyzable atoms and/or at least two, in particular at least three, hydrolyzable groups.

In a first inventive embodiment (i) the silane also obligatorily contains at least one, especially one, nonhydrolyzable, isocyanate-adduct-group-free group with at least one epoxide group and at least one, especially one, nonhydrolyzable, epoxide-group-free group with at least one, especially one, group selected from the group consisting of
   (a) divalent linking urethane groups —NH—C(X)—X— and —X—(X)C—NH—, (b) divalent linking urea groups —HN—C(X)—NH—, and (c) monovalent terminal groups Y—C(X)—NH—, in which the variable X stands for an oxygen or sulfur atom, in particular an oxygen atom, and the variable Y stands for the radical of a blocking agent for isocyanate groups.

In a second inventive embodiment (ii) the silane further obligatorily contains at least one, especially one, nonhydrolyzable group with at least one, especially one, epoxide group and at least one, especially one, group selected from the group consisting of the groups (a), (b), and (c).

In a third inventive embodiment (iii) the silane further obligatorily contains at least one, especially one, nonhydrolyzable, isocyanate-adduct-group-free group with at least one epoxide group, at least one, especially one, nonhydrolyzable, epoxide-group-free group with at least one, especially one, group selected from the group consisting of the groups (a), (b), and (c), and at least one, especially one, nonhydrolyzable group with at least one epoxide group and at least one, especially one, group selected from the group consisting of the groups (a), (b), and (c).

In the case of the urethane group —NH—C(X)—X— the NH function is oriented toward the silicon atom within the group in question; in the case of the urethane group —X—(X)C—NH— this function is remote from the silicon atom within the group in question. The orientation results from the structure of the starting products and from the preparation process employed for the epoxy-functional silanes of the inventive embodiments (i) to (iii).

Suitable hydrolyzable atoms, hydrolyzable groups, nonhydrolyzable, isocyanate-adduct-group-free groups with at least one epoxide group, nonhydrolyzable, epoxide-group-free groups with at least one group (a), (b) and/or (c), and nonhydrolyzable groups with at least one epoxide group and at least one group (a), (b) and/or (c) include all atoms and groups which are conventional in the field of silane chemistry and are described for example in patent applications EP 1 179 575 A 2, WO 00/35599 A, WO 99/52964 A, WO 99/54412 A, DE 197 26 829 A 1, DE 195 40 623 A 1 and DE 199 10 876 A 1, and also all blocked isocyanate groups (c) which result, as is known, from the reactions of isocyanate groups with blocking agents as they are known, for example, from German patent application DE 199 14 896 A 1, column 12, line 11, to column 13, line 2.

It is preferred to employ the silanes of inventive embodiment (ii).

The silane is preferably selected from the group consisting of silanes of the general formulae Ia:

(Ia), in which the indices and the variables of the formula Ia have the following definition:

Z is hydrolyzable, non-isocyanate-reactive atom and/or hydrolyzable, monovalent, non-isocyanate-reactive group;

R is nonhydrolyzable, monovalent, organic group containing at least one epoxide group;

$R^1$ is nonhydrolyzable, monovalent organic group containing no epoxide group;

m is 1, 2 or 3;

n is 1, 2 or 3; and o is 0, 1 or 2;

with the proviso that m+n+o=4; and of silanes of the general formulae Ib:

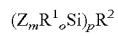
(Ib), in which the variables Z and $R^1$ and also the indices m and o are as defined above, the index p=at least 2, and the variable $R^2$ denotes a nonhydrolyzable, polyvalent, organic group containing at least one epoxide group;

with the proviso that at least one group R and/or $R^1$ of the general formula Ia and at least one group $R^1$ and/or $R^2$ of the general formula Ib includes at least one group selected from the group consisting of (a) divalent linking urethane groups —NH—C(X)—X— and —X—(X)C—NH—, (b) divalent linking urea groups —HN—C(X)—NH—, and (c) monovalent terminal groups Y—C(X)—NH—, wherein the variable X stands for an oxygen or sulfur atom, in particular an oxygen atom, and the variable Y stands for the radical of a blocking agent for isocyanate groups.

Examples of suitable blocking agents are the blocking agents known from the US patent U.S. Pat. No. 4,444,954 A 1:

(1) phenols, such as phenol, cresol, xylenol, nitrophenol, chlorophenol, ethylphenol, t-butylphenol, hydroxybenzoic acid, esters of this acid or 2,5-di-tert-butyl-4-hydroxytoluene;

(2) lactams, such as ε-caprolactam, δ-valerolactam, γ-butyrolactam or β-propiolactam;

(3) active methylenic compounds, such as diethyl malonate, dimethyl malonate, ethyl or methyl acetoacetate or acetylacetone;

(4) alcohols, such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxy methanol, glycolic acid, glycolic esters, lactic acid, lactic esters, methylolurea, methylolmelamine, diacetone alcohol, ethylene chlorohydrin, ethylene bromohydrin, 1,3-dichloro-2-propanol, 1,4-cyclohexyldimethanol or acetocyanohydrin;

(5) mercaptans, such as butyl mercaptan, hexyl mercaptan, t-butyl mercaptan, t-dodecyl mercaptan, 2-mercaptobenzothiazole, thiophenol, methylthio-phenol or ethylthiophenol;

(6) acid amides, such as acetoanilide, acetoanisidinamide, acrylamide, methacrylamide, acetamide, stearamide or benzamide;

(7) imides, such as succinimide, phthalimide or maleimide;

(8) amines, such as diphenylamine, phenylnaphthylamine, xylidine, N-phenylxylidine, carbazole, aniline, naphthylamine, butylamine, dibutylamine or butylphenylamine;

(9) imidazoles, such as imidazole or 2-ethylimidazole;

(10) ureas, such as urea, thiourea, ethyleneurea, ethylenethiourea or 1,3-diphenylurea;

(11) carbamates, such as phenyl N-phenylcarbamide or 2-oxazolidone;

(12) imines, such as ethyleneimine;

(13) oximes, such as acetone oxime, formaldoxime, acetaldoxime, acetoxime, methyl ethyl ketoxime, diisobutyl ketoxime, diacetyl monoxime, benzophenone oxime or chlorohexanone oximes;

(14) salts of sulfurous acid, such as sodium bisulfite or potassium bisulfite;

(15) hydroxamic esters, such as benzyl methacrylohydroxamate or allyl methacrylohydroxamate; or

(16) substituted pyrazoles or triazoles; and also

(17) mixtures of these blocking agents, especially dimethylpyrazole and triazoles, malonic esters and acetoacetic esters or dimethylpyrazol and succinimide.

In the general formulae Ia and Ib the variable Z stands for a hydrolyzable, non-isocyanate-reactive atom and/or a hydrolzable, monovalent, non-isocyanate-reactive group. Preferably the hydrolzable atom Z is selected from the group consisting of fluorine, chlorine, and bromine atoms. The hydrolzable monovalent group Z is preferably selected from the group consisting of monovalent organic groups. The monovalent organic groups Z preferably consist of at least one, especially one, monovalent organic radical selected from the group consisting of branched and unbranched, cyclic and noncyclic alkyl, alkenyl, and alkynyl and also aryl groups, and an oxygen atom or sulfur atom or a carbonyl group or carboxyl group, in particular an oxygen atom, that links the monovalent organic radical to the silicon atom. Particular preference is given to using alkoxy groups having 1 to 4 carbon atoms in the alkyl radical, especially methoxy, ethoxy, propoxy, and butoxy groups, as hydrolyzable monovalent organic groups Z.

As regards the nomenclature of the organic groups Z composed of at least two different radicals (arylalkynyl, for example), the first-mentioned radical (=aryl) denotes the radical which is linked to the silicon atom by way of the oxygen atoms, sulfur atoms, carbonyl groups or carboxyl groups, especially the oxygen atoms.

In the general formula Ia the variable R stands for a nonhydrolyzable monovalent organic group containing at least one, especially one terminal, epoxide group. Preferably the nonhydrolyzable monovalent organic group R containing at least one epoxide group is selected from the group consisting of branched and unbranched alkyl, alkenyl, alkynyl, aryl, arylalkyl, alkylaryl, arylalkenyl, alkenylaryl, arylalkynyl or alkynylaryl groups, it being possible for the alkyl, alkenyl, and alkynyl groups also to be cyclic. Particular preference is given to using alkyl groups and alkylcycloalkyl groups.

As regards the nomenclature of the organic groups R composed of at least two different radicals (arylalkynyl, for example), the first-mentioned radical (=aryl) denotes the radical linked directly to the silicon atom.

In the general formula Ib the variable $R^2$ stands for a nonhydrolyzable polyvalent, especially divalent, organic group containing at least one, especially one terminal, epoxide group. Preferably the nonhydrolyzable monovalent organic group R containing at least one epoxide group is selected from the group consisting of branched and unbranched alkyl, alkenyl, alkynyl, aryl, arylalkyl, alkylaryl, arylalkenyl, alkenylaryl, arylalkynyl or alkynylaryl groups, it being possible for the alkyl, alkenyl, and alkynyl groups also to be cyclic. Particular preference is given to using alkyl groups and alkylcycloalkyl groups. Regarding the nomenclature, refer to the comments made in relation to the group R.

In the general formulae Ia and Ib the variable $R^1$ denotes a nonhydrolyzable monovalent organic group containing no epoxide groups.

Preferably the groups $R^1$ are selected from the group consisting of branched and unbranched alkyl, alkenyl, alkynyl, aryl, arylalkyl, alkylaryl, arylalkenyl, alkenylaryl, arylalkynyl or alkynylaryl groups, it being possible for the alkyl, alkenyl, and alkynyl groups also to be cyclic. As regards the nomenclature, refer to the remarks made in relation to the group R.

In the general formula the index m is 1, 2 or 3, in particular 3, the index n is 1, 2 or 3, especially 1, and the index o is 0, 1 or 2, especially 0, with the proviso that m+n+o=4.

At least one group R and/or $R^1$, in particular at least one group R, of the general formula Ia and at least one group $R^1$ and/or $R^2$, in particular at least one group $R^2$, of the general formula Ib contains or contain at least one, especially one, of the above-described groups (a), (b) and/or (c).

The nonhydrolyzable organic groups R, $R^1$ and $R^2$ may also be substituted. It is important here that the substituents are inert in the sense that they disrupt neither the preparation of the silanes Ia and Ib, the sol-gel process, nor the crosslinking by way of the epoxide groups, and important in particular that they do not inhibit these reactions, trigger them prematurely or lead to unwanted byproducts. Examples of suitable substituents are halogen atoms, especially fluorine atoms, nitrile groups, alkoxy groups or alkoxycarbonyl groups. Preferably the groups R, $R^1$ and $R^2$ are unsubstituted.

The nonhydrolyzable organic groups R, $R^1$, and $R^2$ may also contain divalent functional groups other than the above-described groups (a), (b) and/or (c). Here again it is essential that these functional groups are inert in the sense that they disrupt neither the sol-gel process nor the crosslinking by way of the epoxide groups, and particularly important that they do not inhibit these reactions or trigger them prematurely or lead to unwanted byproducts. Examples of suitable functional groups are ether, thioether, carboxylate, thiocarboxylate, carbonate, thiocarbonate, phosphate, thiophosphate, phosphonate, thiophosphonate, phosphite, thiophosphite, sulfonate, amide, amine, thioamide, phosphoramide, thiophosphoramide, phosphonamide, thiophosphonamide, sulfonamide, imide, hydrazide, carbonyl, thiocarbonyl, sulfone or sulfoxide groups.

The silanes of the general formula Ia or Ib can be prepared by any of a very wide variety of processes of organic chemistry. It is essential that the preparation processes employed here are processes which introduce the above-described groups (a), (b) and/or (c) into the groups R and/or $R^1$ of the formula Ia or into the groups $R^1$ and/or $R^2$ of the formula Ib. This is preferably produced by the reaction of suitable starting products (A) containing at least one, especially one, free isocyanate group and of suitable starting products (B) which contain at least one, especially one, isocyanate-reactive functional group, in particular a hydroxyl group. With particular preference the starting products (B) also contain at least one epoxide group. The epoxide groups are obligatorily present in the starting products (B) if not already present in the starting products (A).

With particular preference the silanes of the general formulae Ia and Ib are prepared by the reaction of (A) isocyanato-containing silanes of the general formula II:

$(Z_m R^1_o Si)_p R^3$                                  (II), in which the index m=1, 2 or 3, especially 3; the index o=0, 1 or 2, especially 0; the index p=1, 2 or a whole number >2, especially 1 or 2; the variable Z is as defined above and the variable $R^3$ stands for a nonhydrolyzable organic group containing at least one, preferably one, in particular one, terminal, free isocyanate group and selected from the group consisting of branched and unbranched alkyl, alkenyl, alkynyl, aryl, arylalkyl, alkylaryl, arylalkenyl, alkenylaryl, arylalkynyl or alkynylaryl groups, it being possible for the alkyl, alkenyl, and alkynyl groups also to be cyclic, but especially alkyl groups; and (B) compounds of the general formula III:

$$(HO)_q R^4 \qquad (III).$$

in which the index q=1 or 2, especially 1, and the variable $R^4$ stands for an organic group containing preferably at least one, more preferably one, in particular one terminal, epoxide group and selected from the group consisting of branched and unbranched alkyl, alkenyl, alkynyl; aryl, arylalkyl, alkylaryl, arylalkenyl, alkenylaryl, arylalkynyl, or alkynylaryl groups, it being possible for the alkyl, alkenyl, and alkynyl groups also to be cyclic, but especially alkyl groups.

The groups $R^3$ and $R^4$ can contain the functional groups and/or substituents described above in connection with the nonhydrolyzable organic groups R, $R^1$, and $R^2$. As regards the nomenclature of the groups $R^3$ and $R^4$, refer to the remarks made in relation to the group R.

Examples of highly suitable starting products (A) are 3-isocyanatopropyltriethoxysilane and the reaction product of isophorone diisocyanate with bis(3-triethoxysilylpropyl)amine (Dynasilan® 1122 from Degussa) in a molar ratio of 1:1.

One example of a highly suitable starting product (B) is glycidol.

Particular preference as silanes, accordingly, is given to the reaction product of glycidol with 3-isocyanatopropyltriethoxysilane and also to the reaction product of glycidol with the reaction product of isophorone dissocyanate with bis(3-triethoxy-silylpropyl)amine (Dynasilan® 1122 from Degussa) in a molar ratio of 1:1.

For the preparation of a composition of the invention at least one, especially one, of the above-described silanes Ia or Ib is subjected to conventional hydrolysis and condensation. The condensation is preferably conducted in an aqueous phase. In that case the silane Ia or Ib can be metered into the aqueous phase or the aqueous phase can be metered into a liquid organic phase comprising or consisting of silane Ia or Ib. Preferably the silane Ia or Ib is metered into the aqueous phase. More preferably the condensation is conducted in the presence of an organic or inorganic acid, in particular an organic acid. Acetic acid is used with preference. The reaction temperatures at which the condensation is carried out can vary widely; preferably it is conducted at a temperature of −10 to +50° C., more preferably from 0 to +40° C., and in particular from +10 to +30° C. It is advisable to allow the resultant reaction mixture to after react for a period of from one hour to three days, in particular for between 8 and 16 hours.

The amount of the silane Ia or Ib or its condensate in the composition of the invention can vary very widely and is guided by the intended use of the composition and by the viscosity which is advantageous for the application. The amount is preferably from 10 to 80%, more preferably from 15 to 75%, very preferably from 20 to 70%, and in particular from 25 to 65% by weight, based in each case on the composition of the invention.

The compositions of the invention may comprise at least one modifier. Examples of suitable modifiers are additives such as are typically used in the field, for example, of coating materials, such as binders, crosslinking agents, pigments, substances curable with actinic radiation, reactive diluents, and adjuvants (cf., for example, German Patent Application DE 199 30 665 A1, page 4, line 17 to page 13, line 20). In selecting the modifiers it should be ensured that they do not have any catalytic effect on the crosslinking of the compositions of the invention by way of the epoxide groups, or do not include any such constituents.

Examples of highly suitable modifiers are binders, particularly in the form of their aqueous dispersions. Especially suitable binders and aqueous dispersions and also the processes for their preparation are known, for example, from German patent application DE 199 30 665 A1, page 3, lines 15 to 47 and page 4, line 17 to page 9, line 2.

The amount of the binders in the compositions of the invention may vary very widely and is guided by their intended use and by the hardness and scratch resistance required for that use. The amount is preferably from 0.1 to 20%, more preferably from 0.2 to 15%, very preferably from 0.3 to 12.5%, and in particular from 0.5 to 10% by weight, based in each case on the composition of the invention.

The modifiers can be added before, during or after the condensation of the silane. They are preferably added after the condensation of the silane to the composition of the invention in question. This can be done using conventional mixing techniques and equipment, such as stirred tanks, dissolvers, Ultraturrax, inline dissolvers, stirrer mills or extruders.

The compositions of the invention serve for producing thermally cured compositions, especially coatings, coating systems, moldings, especially optical moldings, and self-supporting films. The coatings, coating systems and self-supporting films here serve in particular for protecting surfaces of substrates of any kind against damage due to mechanical exposure, particularly for protecting against scratches, and/or for decorating them. The substrates are, in particular, means of transport of any kind, particularly means of transport operated by muscle power, such as cycles or railroad trolleys, aircraft, such as airplanes or airships, marine bodies, such as ships or buoys, rail vehicles, and motor vehicles, such as motor cycles, buses, trucks or automobiles and also parts thereof, constructions, furniture, windows and doors, small industrial parts, coils, freight containers, packaging, white goods, films, optical components, electrical components, mechanical components, and hollow glassware. Further examples of end uses and substrates are known from German patent application DE 198 16 136 A1, column 7, line 54 to column 8, line 58.

With particular preference the compositions of the invention are used for producing highly scratch-resistant clearcoats as part of automotive OEM finishing with multicoat color and/or effect paint systems. As is known, these particularly high-grade multicoat paint systems are produced by what are termed wet-on-wet processes, as known, for example, from German patent application DE 199 30 665 A1, page 15, line 15 to page 16, line 24.

For producing the coatings and coating systems of the invention the compositions of the invention are applied by means of the appropriate techniques conventional for the particular end use, such as by spraying, knife coating, brushing, pouring, dipping, impregnating, trickling or rolling, for example. In the course of such application the substrate to be coated may itself be at rest, with the application equipment or unit being moved. Alternatively, the substrate to be coated, particularly a coil, can be moved, with the application unit being at rest relative to the substrate or being moved appropriately.

For producing the moldings of the invention the compositions of the invention are poured into suitable hollow molds and cured therein, after which they are released from the molds.

For producing the films of the invention the conventional methods such as casting or film blowing are employed.

Curing of the compositions of the invention may take place after a certain rest period. This may have a duration of from 30 seconds to 2 hours, preferably from 1 minute to 1 hour, and in particular from 1 to 45 minutes. The rest period serves, for example, for leveling and devolatilization of the coating films or for the evaporation of volatile constituents. The rest period can be assisted and/or shortened by the application of elevated temperatures up to 90° C. and/or by a reduced atmospheric humidity of <10 g water/kg air, in particular <5 g/kg air, provided this does not entail any damage to or change in the compositions of the invention, such as premature complete crosslinking, for instance.

Thermal curing has no particular features as far as its method is concerned but instead takes place in accordance with the conventional methods such as heating in a forced-air oven or irradiation using IR lamps. Thermal curing may also take place in stages. Another preferred method of curing is that of curing with near infrared (NIR) radiation. Particular preference is given to employing a process in which the water constituent is removed rapidly from the wet films. Suitable processes of this kind are described, for example, by Rodger Talbert in Industrial Paint & Powder, 04/01, pages 30 to 33, "Curing in Seconds with NIR", or in galvanotechnik, Volume 90 (11), pages 3098 to 3100, "Lackiertechnik, NIR-Trocknung im Sekundentakt von Flussig- und Pulverlacken" [Coating technology: NIR drying within seconds of liquid and powder coatings].

Thermal curing takes place advantageously at a temperature of from 50 to 170° C., more preferably from 60 to 165° C., and in particular from 80 to 150° C. for a time of from 1 minute to up to 2 hours, more preferably from 2 minutes up to 1 hour, and in particular from 3 to 30 minutes.

It is surprising that the thermal curing of the compositions of the invention proceeds rapidly and without problems without the use of external catalysts. The absence of external catalysts has the further advantage that the resulting thermally cured compositions of the invention contain no residues of catalyst, which could lead to discoloration, odor problems and/or to damage to substrates and/or to one or more coats of multicoat color and/or effect paint systems.

EXAMPLES

Preparation Example 1

The Preparation of an Epoxy-Functional Silane of the General Formula Ia Containing Urethane Groups In a flask equipped with a reflux condenser and a stirrer 24.737 g (0.1 mol) of 3-isocyanatopropyltriethoxysilane and 7.41 g (0.1 mol) of glycidol were brought together under nitrogen and the mixture is heated at 60° C. with stirring. After 16 hours the reaction had run its complete course, as was demonstrated by the disappearance of the isocyanate band from the IR spectrum of the reaction mixture.

Preparation Example 2

The Preparation of an Epoxy-Functional Silane of the General Formula Ib Containing Urethane Groups In a flask equipped with a reflux condenser and a stirrer 15.34 g of isophorone diisocyanate (0.069 mol) were dissolved under nitrogen in 11.56 g of methyl ethyl ketone and the solution was cooled to 10° C. This was followed by the slow metered addition, with stirring, of 29.38 g (0.069 mol) of bis(3-triethoxysilylpropyl)amine (Dynasilan® 1122 from Degussa). When the addition was at an end the reaction mixture was slowly warmed to room temperature. Then 5.27 g (0.07 mol) of glycidol were metered slowly into the resulting mixture. The resulting reaction mixture was stirred under nitrogen at room temperature for 14 hours and at 60° C. for 10 hours, after which the reaction was at an end (as demonstrated by the disappearance of the isocyanate band from the IR spectrum of the reaction mixture).

Preparation Example 3

The Preparation of a Binder Dispersion

In a reaction vessel equipped with stirrer, reflux condenser and two feed vessels 609.2 parts by weight of deionized water were introduced and this initial charge was heated to 90° C. Subsequently, at 90° C., two separate feed streams were metered in parallel to start with. Feed stream 1 consisted of 46 parts by weight of potassium peroxodisulfate in solution in 900 parts by weight of deionized water. Feed stream 2 consisted of 163.6 parts by weight of tertiary-butyl methacrylate, 16.1 parts by weight of methyl methacrylate, 270.7 parts by weight of hydroxypropyl methacrylate and 36.5 parts by weight of diphenylethylene. The rates at which the feeds were added were chosen so that feed stream 2 had all been metered in after 3 hours while the entirety of feed stream 1 was not metered in until after 3.5 hours. After the end of the feeds the reaction mixture was postpolymerized at 90° C. for 30 minutes. The resulting dispersion had a solids content of 26.1% by weight.

Example 1

The Preparation of a Coating Material Based on the Silane of the General Formula Ia and Production of a Clearcoat from It A reaction vessel equipped with dropping funnel and stirrer was charged with 1.08 parts by weight of deionized water, 3.0 parts by weight of glacial acetic acid and parts by weight of 0.1 N acetic acid. The mixture was slowly admixed, with stirring, with 32.1 parts by weight of the silane from preparation example 1. The resulting mixture was stirred at room temperature for 12 hours. The resultant coating material was knife coated onto a glass panel and the resulting film was cured at 140° C. for 22 minutes.

The clearcoat obtained in this way had a dry film thickness of 15 μm. It was free from stress cracks and other surface defects. It was also highly scratch-resistant, a point underlined by means of the steel wool scratch test (rating 1-2).

The steel wool scratch test was carried out using a hammer to DIN 1041 (weight without shaft: 800 g; shaft length: 35 cm). The test panels were stored at room temperature for 24 hours prior to the test.

The flat side of the hammer was wrapped with a ply of steel wool and fastened to the upturned sides using Tesakrepp. The hammer was placed onto the clearcoats at right angles. The weighted part of the hammer was guided over the surface of the clearcoat in a track without tipping and without additional physical force.

For each test, 10 double strokes were performed by hand. After each of these individual tests the steel wool was replaced.

Following exposure, the areas under test were cleaned with a soft cloth to remove residues of the steel wool. The test areas were evaluated visually under artificial light and rated as follows:

| Rating | Damage |
|---|---|
| 1 | none |
| 2 | slight |
| 3 | moderate |
| 4 | moderate to middling |
| 5 | severe |
| 6 | very severe |

Evaluation was carried out immediately after the end of the test.

Example 2

The Preparation of a Coating Material Based on the Silane of the General Formula Ib and Production of a Clearcoat from It A reaction vessel equipped with dropping funnel and stirrer was charged with 0.5 part by weight of deionized water, 6.3 parts by weight of 0.1 N acetic acid and 0.75 part by weight of glacial acetic acid. The mixture was slowly admixed, with stirring, with 14.5 parts by weight of the silane Ib from preparation example 2. The resulting turbid mixture was stirred at room temperature for 5 hours. After just 4 hours the mixture slowly began to clear and after 5 hours it was completely transparent.

The resulting coating material was knife coated onto a glass panel and the resulting film was cured at 140° C. for 22 minutes.

The clearcoat had a dry film thickness of 20 µm. It was free from stress cracks and other surface defects. The scratch resistance was very good, as demonstrated using the steel wool scratch test: a rating of 2 was obtained.

The acid resistance was tested by means of the BART.

The BART (BASF ACID RESISTANCE TEST) was used to determine the resistance of the clearcoat to acids, alkalis, and water drops. In this test the clearcoat was exposed to a further temperature load in a gradient oven after baking at 40° C. for 30 minutes. Beforehand the test substances (sulfuric acid 10% strength, 36% strength; sulfurous acid 6% strength, hydrochloric acid 10% strength, sodium hydroxide solution 5% strength, DI (i.e., fully demineralized or deionized) water—1, 2, 3 or 4 drops) were applied in a defined manner using a volumetric pipette. After the clearcoat had been exposed to the substances they were removed under running water and the damage was assessed visually after 24 h in accordance with a predetermined scale:

| Rating | Appearance |
|---|---|
| 0 | no defect |
| 1 | slight marking |
| 2 | marking/matting/no softening |
| 3 | marking/matting/color change/softening |
| 4 | cracks/incipient etching |
| 5 | clearcoat removed |

Each individual mark (spot) was evaluated and the result was recorded in the form of a rating for each test substance:

| Test Substance | Rating |
|---|---|
| Sulfuric acid 10% strength | 0 |
| Sulfuric acid 36% strength | 0 |
| Hydrochloric acid 10% strength | 1 |
| Sulfurous acid 6% strength | 0 |
| Sodium hydroxide solution 5% strength | 0 |
| Deionized water | 0 |

The clearcoat, accordingly, had a very good acid resistance.

The chemical resistance of the clearcoat was determined by means of the gradient oven test. For that purpose the coating material was applied to a base coat on a metal test panel and cured at 140° C. for 22 minutes. The resultant clearcoat was exposed to test substances and a determination was made of the temperatures from which the test substances began to damage the clearcoat. The results obtained were as follows:

| Tree resin | >75° C. |
|---|---|
| NaOH | 50° C. |
| Pancreatin | 72° C. |
| Sulfuric acid | 43° C. |
| Deionized water | >75° C. |

The clearcoat, accordingly, had a very good chemical resistance.

Examples C1 to C3 (Comparative)

The Preparation of Coating Materials Based on Epoxy-Functional Silanes and Production of Clearcoats from Them Three reaction vessels equipped with dropping funnel and stirrer were each charged with 1.08 parts by weight of deionized water, 3.0 parts by weight of glacial acetic acid and 25 parts by weight of 0.1 N acetic acid. The mixtures were admixed slowly with in the case of example C1, 23.6 parts by weight of glycidyloxypropyltrimethoxysilane;
in the case of example C2, 27.8 parts by weight of glycidyloxypropyltriethoxysilane; and
in the case of example C3, 28.8 parts by weight of 2-(3,4-epoxycyclohexyl)ethyltriethoxysilane and stirred at room temperature for 12 hours. The resulting coating materials were knife coated onto glass panels and the resulting films were cured at 140° C. for 22 minutes.

The resulting clearcoats had a dry film thickness of 15 µm. Their surfaces, however, were soft and exhibited the properties of an uncrosslinked or only slightly crosslinked film. Simple pressing with the fingernail produced severe defects in the clearcoats. The scratch resistance of the clearcoats was poor (steel wool scratch test rating: 6).

Example C4 (Comparative)

The Preparation of a Coating Material Based on an Epoxy-Functional Silane and Production of a Clearcoat from It A reaction vessel equipped with dropping funnel and stirrer was charged with 10 parts by weight of glacial acetic acid and 15 parts by weight of 0.1 N acetic acid. The mixture was slowly admixed with 52.48 parts by weight of 5,6-epoxy-hexyltriethoxysilane and stirred at room temperature for 12 hours. The resulting coating material was knife coated onto a glass panel and the resulting film was cured at 140° C. for 22 minutes.

The resulting clearcoat had a dry film thickness of 15 μm. Its surface, however, was soft and showed the properties of an uncrosslinked or only slightly crosslinked film. Simple pressing with the fingernail produced severe defects in the clearcoat. The scratch resistance of the clearcoat was poor (steel wool scratch test rating: 6).

Example 3

The Preparation of a Coating Material Based on a Condensate of a Silane of the General Formula Ia and a Binder and Production of a Clearcoat from It 133 parts by weight of the coating material from preparation example 1 were added to 35 parts by weight of the binder dispersion from preparation example 3. The resulting coating material was stirred at room temperature for 2 hours. It was completely stable on storage over 6 days; no increase in viscosity was found within this period.

The coating material was knife coated onto a glass panel. The resulting film was cured at 140° C. for 22 minutes.

The resulting clearcoat was of high gloss (>80 units at 20°), clear, and transparent. Its dry film thickness was 40 μm. It was free from stress cracks and surface defects. The scratch resistance was outstanding (steel wool scratch test rating: 1-2).

Examples C5 and C6 (Comparative)

Preparation of Coating Materials Based on Condensates of Epoxy-Functional Silanes and Binders and Production of Clearcoats from Them Example 3 was repeated but using, instead of the coating material of example 1, in the case of example C5 the coating material from example C1 and in the case of example C6 the coating material from example C2.

The resulting coating materials were knife coated onto glass panels and the resulting films were cured at 140° C. for 22 minutes.

The resulting clearcoats had a dry film thickness of 40 μm. Their surfaces were soft and showed the properties of an uncrosslinked or only slightly crosslinked film. Simple pressing with the fingernail produced severe defects in the clearcoats. The scratch resistance of the clearcoats was poor (steel wool scratch test rating: 6).

Example C7 (Comparative)

The Preparation of a Coating Material Based on the Condensate for an Epoxy-Functional Silane, a Binder and an External Catalyst 2.78 parts by weight of boehmite (Dispersal® P3 from Sasol Germany GmbH) were added to 25 parts by weight of 0.1 N acetic acid. The resulting mixture was stirred at room temperature until the boehmite had completely dissolved. Then the colloidal solution was treated with ultrasound for 5 minutes.

The resultant homogeneous boehmite sol was admixed with 27.8 parts by weight of glycidyloxypropyltriethoxysilane. The resultant mixture was stirred at room temperature for 12 hours.

133 parts by weight of this mixture were mixed with 35 parts by weight of the binder dispersion from preparation example 3. The resulting coating material was stirred at room temperature for 10 minutes. Even in just this short time there was a drastic increase in viscosity. After just 2 to 4 hours the coating material had gelled completely. Application of the fresh coating material 10 minutes after its preparation to a glass panel, and curing of the resulting film at 140° C. for 22 minutes, gave a scratch-resistant transparent clearcoat which, however, exhibited surface defects and gel specks.

What is claimed is:

1. An autocatalyzed, thermally curable composition free from external catalysts and comprising
   10 to 80% by weight, based on the total weight of the composition, of at least one condensate of at least one silane consisting of silane selected from the group of silanes which contain at least one of hydrolyzable atom and one hydrolyzable group and also at least one
   (i) nonhydrolyzable, isocyanate-adduct-group-free group with at least one epoxide group, and at least one nonhydrolyzable, epoxide-group-free group with at least one group selected from the group consisting of
      (a) divalent linking urethane groups —NH—C(X)—X—and —X—(X)C—NH—, and
      (b) divalent linking urea groups —HN—C(X)—NH—,
      in which the variable X stands for an oxygen or sulfur atom;
   (ii) nonhydrolzable group with at least one epoxide group and at least one group selected from the group consisting of the groups (a) and (b), and
   (iii) nonhydrolyzable, isocyanate-adduct-group-free group with at least one epoxide group, at least one non-hydrolyzable, epoxide-group-free group with at least one group selected from the group consisting of the groups (a) and (b), and at least one nonhydrolyzable group with at least one epoxide group and at least one group selected from the group consisting of the groups (a) and (b); and
   0.1 to 20% by weight, based on the total weight of the composition, of a binder.

2. The thermally curable composition as claimed in claim 1, wherein the silane is selected from the group consisting of silanes of the general formula Ia:

$$Z_m SiR_n R^1{}_o \quad \text{(Ia)},$$

in which the indices and the variables of the formula Ia have the following definition:
Z is hydrolyzable, non-isocyanate-reactive atom and/or hydrolyzable, monovalent, non-isocyanate-reactive group;
R is nonhydrolyzable, monovalent, organic group containing at least one epoxide group;
$R^1$ is nonhydrolyzable, monovalent organic group containing no epoxide group;
m is, 1, 2 or 3;
n is, 1, 2 or 3; and
o is, 0, 1 or 2;
with the proviso that m+n+o=4; and
of silanes of the general formulae Ib:

$$(Z_m R^1{}_o Si)_p R^2 \quad \text{(Ib)}$$

in which the variables Z and $R^1$ and the indices m and o are as defined above in (Ia), wherein the index p is at least 2, and the variable $R^2$ denotes a nonhydrolyzable, polyvalent, organic group containing at least one epoxide group;

with the proviso that at least one group R and/or $R^1$ of the general formula Ia and at least one group $R^1$ and/or $R^2$ of the general formula Ib includes at least one group consisting of the groups (a) and (b).

3. The thermally curable composition as claimed in claim 2, wherein the indices m, n, and o in the formula Ia have the following definitions: m=3, n=1, and o=0; and the indices m, o, and p in the general formula Ib have the following definitions: m=3, o=0, and p=2.

4. The thermally curable composition as claimed in claim 2, wherein the hydrolyzable, non-isocyanate-reactive atom Z is selected from the group consisting of fluorine, chlorine, and bromine atoms and the hydrolyzable, monovalent, non-isocyanate-reactive group Z is selected from the group consisting of monovalent organic groups.

5. The thermally curable composition as claimed in claim 4, wherein the hydrolyzable, monovalent, non-isocyanate-reactive organic group Z is an alkoxy group having 1 to 4 carbon atoms in the alkyl radical.

6. The thermally curable composition as claimed in claim 5, wherein the groups R and $R^2$ are selected from the group consisting of alkyl groups and alkylcycloalkyl groups.

7. The thermally curable composition as claimed in claim 2, wherein the nonhydrolyzable, monovalent organic group R containing at least one epoxide group and the nonhydrolyzable polyvalent organic group $R^2$ are selected from the group consisting of alkyl, alkenyl, alkynyl, aryl, arylalkyl, alkylaryl, arylalkenyl, alkenylaryl, arylalkynyl or alkynylaryl groups, and cyclic alkyl, alkenyl, and alkynyl groups.

8. The thermally curable composition as claimed in claim 2, wherein the groups R and $R^2$ contain at least one terminal epoxide group.

9. The thermally curable composition as claimed in claim 2, wherein the groups R and $R^2$ contain an epoxide group.

10. The thermally curable composition as claimed in claim 2, wherein the nonhydrolyzable monovalent organic group $R^1$ containing no epoxide group is selected from alkyl, alkenyl, alkynyl, aryl, arylalkyl, alkylaryl, arylalkenyl, alkenylaryl, arylalkynyl or alkynylaryl groups, it being possible for the alkyl, alkenyl, and alkynyl groups also to be cyclic.

11. The thermally curable composition as claimed in claim 2, wherein the groups R and $R^2$ contain at least one group selected from the group consisting of the groups (a) and (b).

12. The thermally curable composition as claimed in claim 1, wherein X=oxygen atom.

13. The thermally curable composition as claimed in claim 1, comprising at least one modifier.

14. Products comprising the thermally cured compositions of claim 1 selected from the group consisting of coatings, coating systems, moldings, and self-supporting films.

15. A substrate having thereon the product of claim 14, wherein the substrate is selected from the group consisting of means of transport and parts thereof, constructions, furniture, windows, doors, small industrial parts, coils, freight containers, packaging, white goods, films, optical components, electrical components, mechanical components, and hollow glassware.

16. A process for producing thermally cured compositions from thermally curable compositions based on condensates of epoxy-functional silanes, which comprises thermally curing at least one thermally curable composition as claimed in claim 1 in the absence of external catalysts.

17. The autocatalyzed, thermally curable composition of claim 1, wherein the at least one condensate is the reaction product of glycidol with 3-isocyanatopropyltriethoxysilane, the reaction product of glycidol with the reaction product of isophorone diisocyanate with bis(3-triethoxysilylpropyl) amine in a molar ratio of 1:1, or a combination thereof.

18. The autocatalyzed, thermally curable composition of claim 1, wherein the binder comprises an acrylate binder.

* * * * *